G. W. ZEIER.
HUSKER.
APPLICATION FILED MAR. 4, 1922.

1,424,060.

Patented July 25, 1922.
6 SHEETS—SHEET 1.

G. W. Zeier,
INVENTOR

BY Victor J. Evans
ATTORNEY

WITNESS:

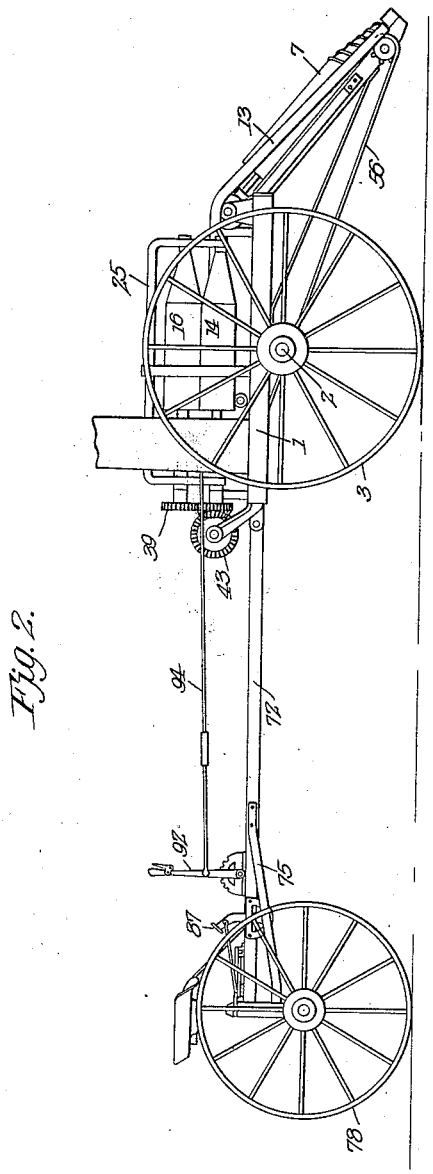

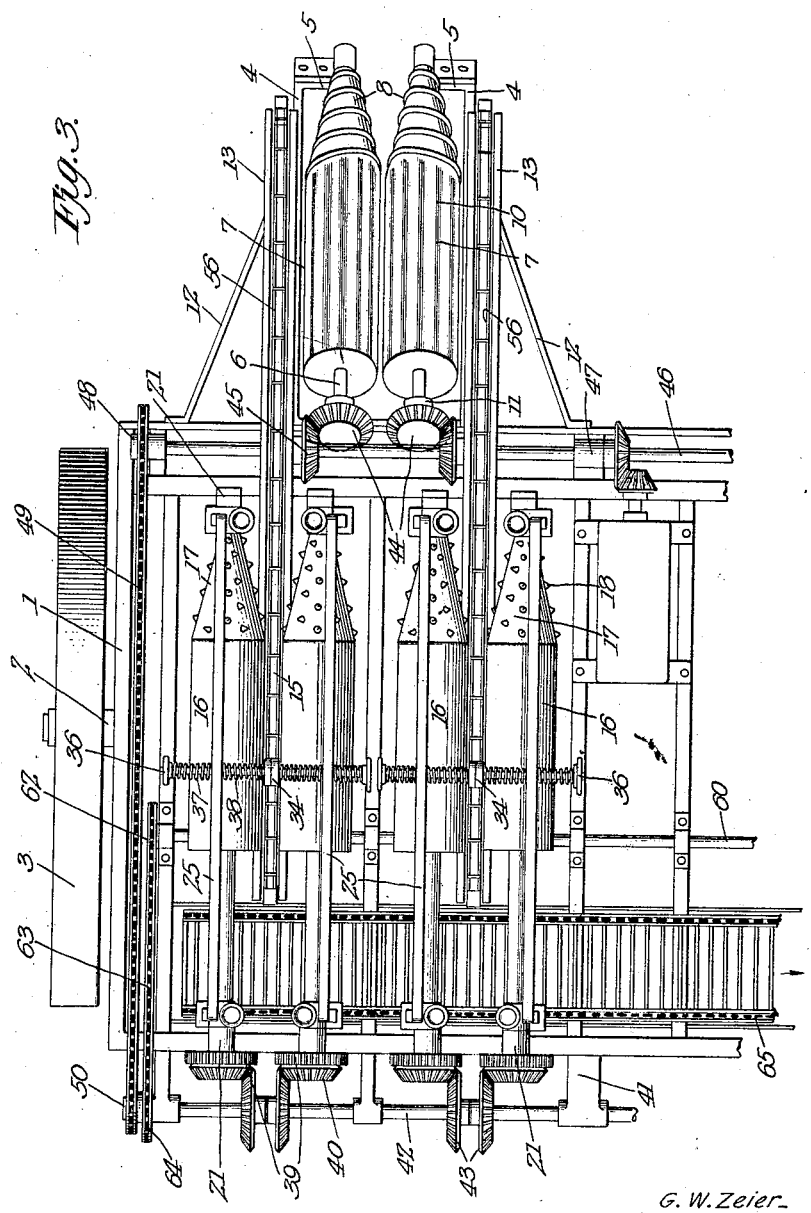

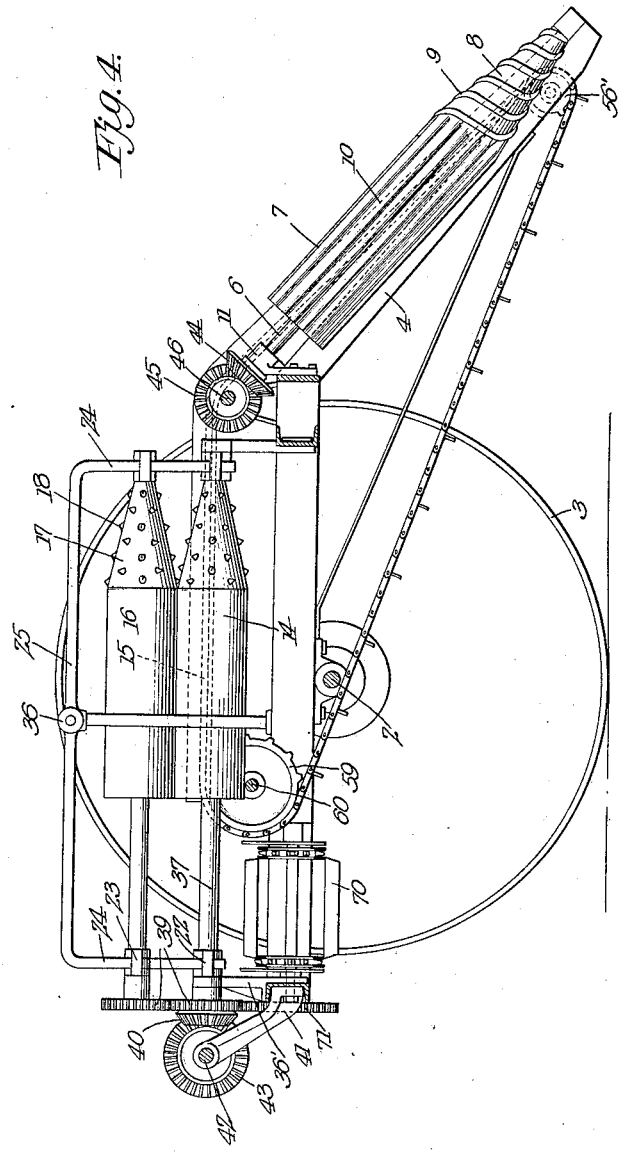

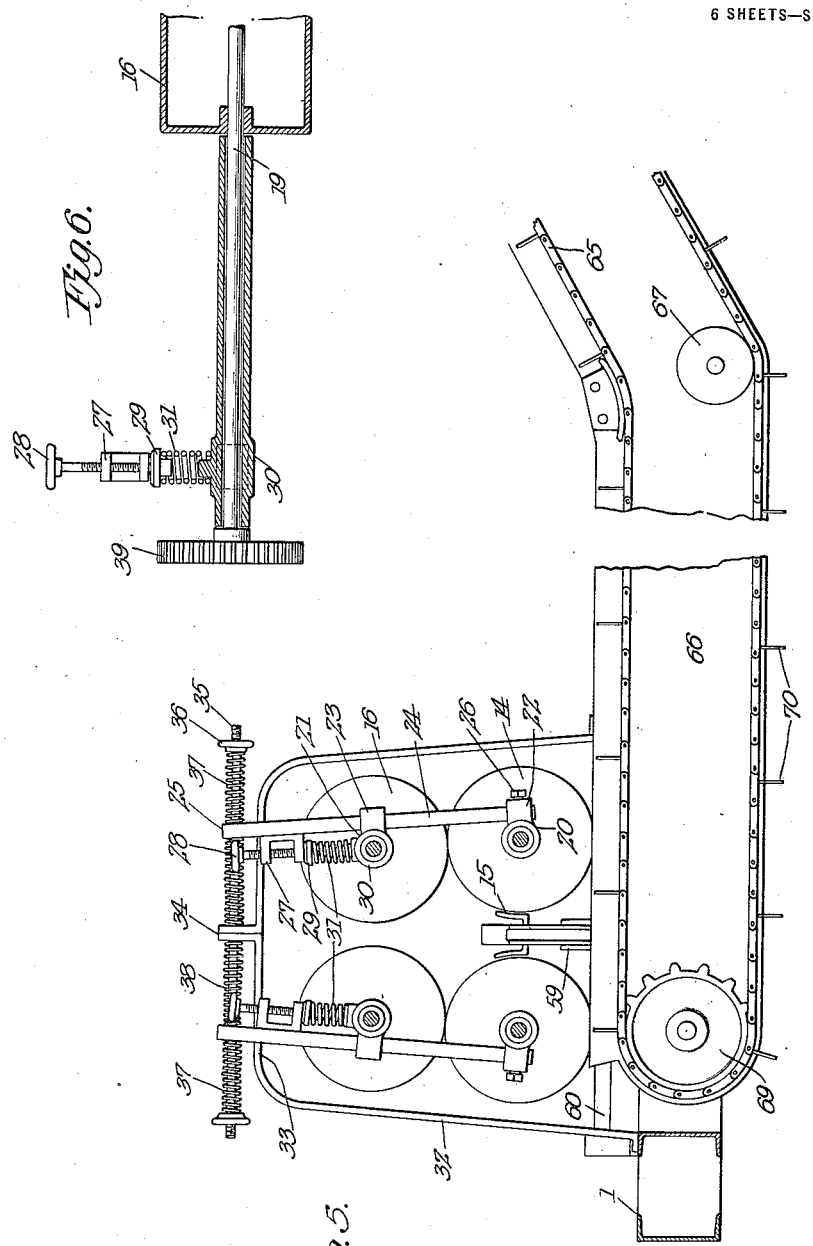

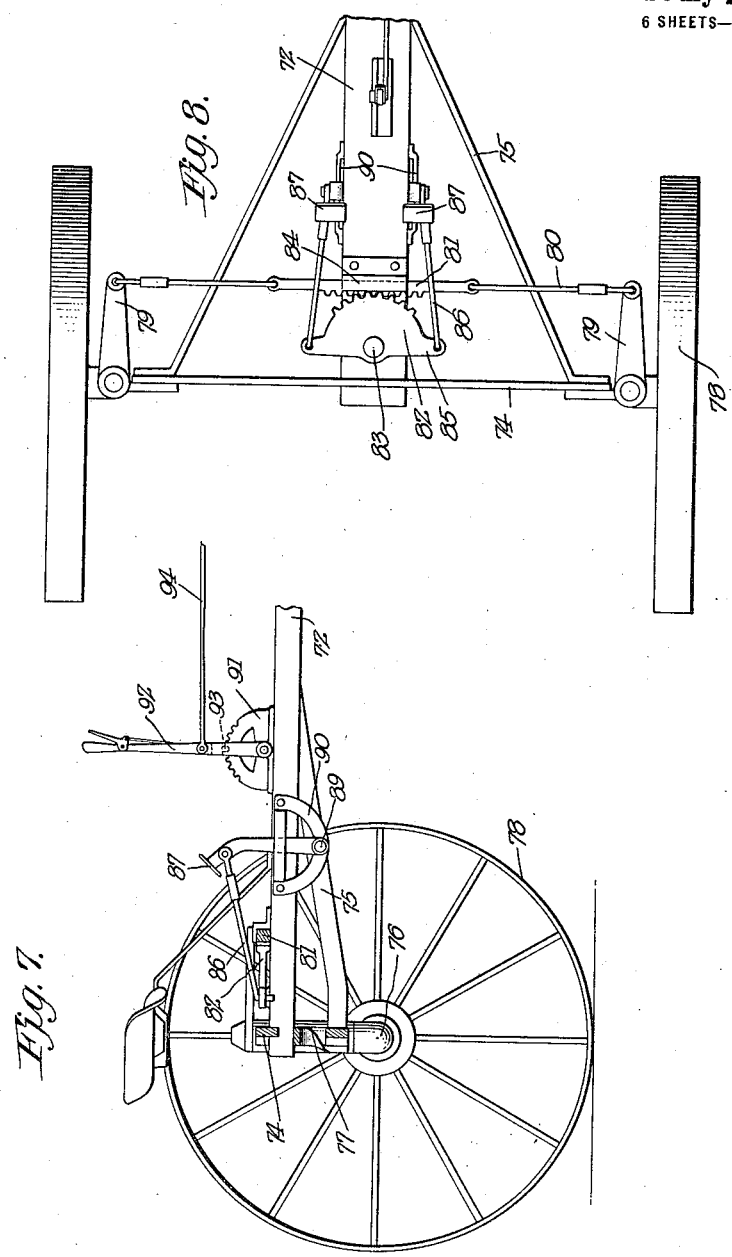

UNITED STATES PATENT OFFICE.

GEORGE W. ZEIER, OF ETHAN, SOUTH DAKOTA.

HUSKER.

1,424,060.  Specification of Letters Patent.  Patented July 25, 1922.

Application filed March 4, 1922. Serial No. 541,151.

*To all whom it may concern:*

Be it known that I, GEORGE W. ZEIER, a citizen of the United States, residing at Ethan, in the county of Davison and State of South Dakota, have invented new and useful Improvements in Huskers, of which the following is a specification.

My present invention has reference to a corn husking machine.

An object of the invention is to produce a wheeled frame having snapping rolls of a particular and peculiar formation arranged in cooperating pairs and supported at a downward angle from the front of the frame, while supported on the frame to the rear of the snapping rolls are husking rolls arranged in superimposed pairs, spring means influencing the upper toward the lower husking rolls, means being provided for delivering the corn from the snapping to the husking rolls, means being provided for delivering the corn from the husking rolls, and means being also provided for simultaneously imparting motion to all of the rolls.

The foregoing, and other objects which will appear as the nature of the invention is better understood, may be accomplished by a construction, combination and operative association of parts, such as is disclosed by the drawings which accompany and which form part of this specification.

In the drawings:—

Figure 2 is a side elevation thereof.

Figure 3 is an enlarged top plan view of approximately one-half of the device.

Figure 4 is a sectional view taken in a line approximately centrally between the snapping rolls.

Figure 5 is an enlarged fragmentary sectional view in a line with the elevator and looking from the rear of the machine.

Figure 6 is a fragmentary sectional view in a line with one of the shafts 19, through the bearing sleeve for the said shaft and through the rear of one of the husking rolls.

Figure 7 is a sectional view taken longitudinally to one side of the center of the construction illustrated in Figure 8.

Figure 8 is a plan view of the truck employed, the driver's seat being removed.

Figure 1:
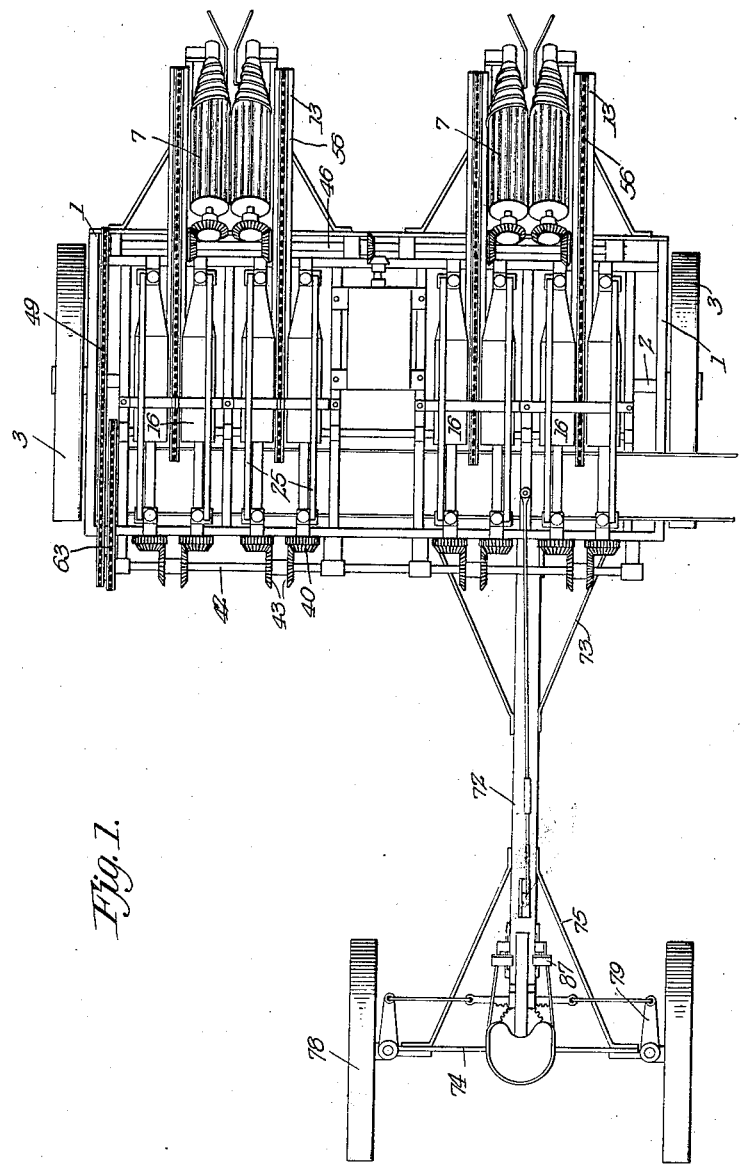
Figure 1 is a plan view of a husking machine constructed in accordance with this invention.

The body of my improved husking machine is in the nature of a substantially rectangular frame and is broadly indicated by the numeral 1. The frame or body 1 has secured thereto an axle 2 whose ends are provided with spindles on which are journaled the ground wheels 3.

On the front beam of the body frame 1, adjacent to the ends thereof there are secured the central or connecting portions of the downwardly inclined arms 4 of substantially U-shaped members. The U-shaped members are constructed of suitable metal and the lower or outer ends of the said arms are provided with inturned extensions 5 that are provided with bearings for the lower ends of the shafts 6 of the snapping rolls 7. The body of each roll 7 is hollow, the said rolls being constructed of metal, and the lower portions thereof are pointed or cone-shaped, as at 8. The conical ends of the rolls have screw threads therein, and the cylindrical bodies of the rolls are fluted or ribbed, as at 10. The shafts 6 project beyond the upper closed ends of the body portions of the rolls and are received in suitable bearings 11 secured to the front beam of the body frame 1.

The U-shaped members are additionally supported by angle brace members 12 between the front of the frame 1 and the outer ends of the arms of the said members. The arms 4 and the brace members 12 also serve to support troughs 13 arranged along the outer sides of the cooperating pairs of snapping rolls 7. The husking rolls are mounted horizontally on the body frame 1 and are arranged in superimposed pairs, two of such pairs being disposed to the opposite sides of the center of the respective troughs 13, the said troughs being extended horizontally between the lower opposed pairs of husking rolls, the lower of these pairs of husking rolls being indicated by the numeral 14. For distinction, the horizontal branch of the inclined troughs 13 are indicated by the numeral 15, and the upper series of husking rolls by the numeral 16. The respective rolls 16 may be in frictional contact with the respective lower rolls 14. These rolls each comprise a hollow body having one end pointed or cone-shaped, as at 17, the said conical ends being directed toward the front of the machine and being provided with spurs or fingers 18. All of the rolls 14 and 16 have centrally secured thereto shafts 19 which extend a greater distance beyond their rear than their forward ends. Both ends of the respective shafts are received in similarly constructed bearings, the bearings for the lower shafts being indicated by the numeral 20 and those for the upper shafts by the numeral 21. The bearings 20 and 21 respectively are secured on boxings 22 and 23 respectively, the said boxings being slidable in the parallel arms 24 of substantially U-shaped members, the connecting element for the arms of the said U-shaped members being, for distinction, indicated by the numeral 25. The boxings 22 are adjustably secured on the arms 24 of the U-shaped members by binding means such as bolts 26, the boxings 23 for the bearings 21 being merely in the nature of guides. On the arms 24 of each of the U-shaped members there are inwardly extending brackets 27 provided with threaded openings and receiving in the said openings screws 28. These screws have their lower ends swiveled in washer members 29, the said washers being substantially cup-shaped and having their hollow faces disposed next to cup-shaped washers 30 that are secured upon the upper faces of the bearings 21. Received in and, of course, arranged between the washers 29 and 30, are helical springs 31. The screws 28 adjust the tension of the springs, and therefore regulate the frictional engagement of the upper rolls 16 with the lower rolls 14.

Suitably secured to certain of the longitudinal bars of the body frame 1, to the opposed sides of the cooperating series of husking rolls are the legs of yoke members 32. Preferably, each yoke 32 is constructed of two members, each member constituting a leg and an angle extension at the upper ends thereof, the said extensions, indicated by the numeral 33, being inwardly directed and terminating in upwardly extending contacting lugs 34. These lugs are provided with openings which align with similar openings in the longitudinal or connecting portions 25, for the arms or legs 24 of the U-shaped members, and passing through these openings there is a screw 35. The ends of the screw are engaged by adjusting nuts 36, and between the said nuts and the outer faces of the elements 25, are helical springs 37 respectively. Also surrounding the screws and exerting a tension between the lugs 34 and the inner faces of the elements 25 are helical springs 38 respectively. It will be apparent that by adjusting the nuts 36, the tension of the springs may be regulated, and as a consequence, the U-shaped members carrying the bearings for the rolls may be swung angularly so that the upper pairs of husking rolls 16 may be moved toward each other over the lower pair of husking rolls 14. The shafts for the lower series of husking rolls are journaled in additional stationary bearings which permits of the free turning of the rolls but holds the same against side or longitudinal movement.

From the rear of the frame 1 there are suitable upstanding plates or brackets 36′ provided with bearing openings for the shafts 19. These bearing plates or brackets are provided with tubes 37 that receive therein the said shafts 19, the tubes being provided for preventing clogging of the husked corn when the same is delivered from between the cooperating pairs of husking rolls on to the endless conveyor or elevator that is arranged directly below the said tubes and to the rear of the husking rolls.

The shafts 19 have their ends which project through their bearings 36 provided with pinions 39, the pinions of the respective upper and lower shafts being in mesh, and on the outer face of the pinions on the lower shafts there are keyed or otherwise secured beveled gears 40.

Supported in suitable bearings extending outwardly from the rear beam of the frame 1, and which are indicated by the numeral 41 is a shaft 42. On this shaft there are a plurality of gears 43 whose beveled faces are oppositely disposed and which are in mesh with the gears 40. Thus on the turning of the shaft 42 the respective lower pairs of cooperating husking rolls will be reversely turned, the said husking rolls being turned toward each other, as indicated by the arrows in Figure 1 of the drawings. The turning of the lower rolls will likewise impart motion to the upper rolls which are in frictional contact therewith, and the opposed pairs of upper rolls will be likewise reversely turned.

The shafts 6 for the snapping rolls have on their ends which project through their bearings 11 gears 44, and these gears are in mesh with gears 45 arranged in pairs, whose beveled faces are disposed toward each other. The gears 45 are secured on a shaft 46 mounted in suitable bearings 47 on the front beam of the frame 1. The turning of the shaft 46 will cause the cooperating pairs of snapping rolls to turn toward each other, in the direction of the arrows in Figure 1 of the drawings. The shaft 46 has on one of its ends a sprocket wheel 48 around which is trained a sprocket chain 49, the said chain being likewise trained around a sprocket wheel 50 on the motion imparting shaft 42 for the husking rolls.

In the troughs 13 and 15 there is the upper lead of a conveyor chain 56. The lower lead of the chain may be slack, the front end of the chain being trained around sprocket wheels 57 whose shafts are journaled in bearings in the troughs 13, the opposite ends of the chains being trained around enlarged sprocket wheels 59 that are mounted in a shaft 60 arranged in suitable bearings 61 on the frame 1. The sprocket wheel 59 is of a materially greater diameter than the sprocket wheel 57, so that the lower lead of the chain will be arranged a suitable distance below the lower husking rolls and also whereby the upper lead of the chain will be disposed approximately slightly below the contacting surface of the upper and lower husking rolls. The trough 13 being U-shaped in cross section has its walls directed toward the conveyor chain, so that the ears of corn will be positively elevated to the main frame and thereafter delivered between the pairs of husking rolls. The spurs or fingers 18 on the conical ends 17 of the husking rolls first contact with the corn so as to remove the husks therefrom. Thereafter the corn being jostled between the opposed cooperating pairs of rolls will be effectively husked and delivered on to the elevator from whence it is directed to one side of the machine into the bed of a wagon or the like. The shaft 60 has on one end thereof a sprocket wheel 62 around which is trained a sprocket chain 63 which is also trained around a similar sprocket wheel 64 on the motor driven shaft 42.

The elevator comprises two spaced endless chains 65, the outer end of the elevator being elevated or arranged at an upward angle, and to provide for this the side bars 66 between which the chains are arranged have suitable rolls 67 journaled therebetween as well as the sprocket wheels 69 at the ends of the frame for the elevator. The spaced chains of the elevator are connected by flights 70, and the shaft for the inner sprocket wheels derives power through the medium of a gear on shaft 71 which is in mesh with the gear 39 on the lower left husking roll. The elevator travels in the direction of the arrow in Figure 3 of the drawings.

Secured to the rear of the frame 1 is a beam 72. Between the frame and the beam there are braces 73. The outer end of the beam is supported upon a frame 74 supported by suitable brace means 75. The axle, as well as the frame has pivoted or otherwise loosely secured adjacent its ends uprights 77 that have their lower ends formed with outstanding spindles on which are journaled the guide wheels 78. The members 77, at their upper ends have offset portions or extensions 79, the said extensions being connected, preferably by adjustable means 80 to a rack bar 81. The rack bar is in mesh with the toothed segment 82 that is pivoted, as at 83 on the beam 72. Suitable means, preferably spring influenced indicated by the numeral 84 is provided for keeping the rack bar in mesh with the segment 82. The segment has its inner face provided with outwardly extending arms 85 and each of these arms is connected by a link 86 to a foot pedal 87. The foot pedals have their shank portions downwardly directed and are journaled upon a shaft 89 secured to the under face of the beam 72, while suitable arched plates 90 are provided for holding the foot pedals against accidental movement. It will be apparent that by depressing one of the foot pedals, the segments will be turned in one direction and the rack bar will be likewise moved longitudinally in one direction. This will cause the offset ends of the pivot members to turn and likewise turn the wheels in one direction, and by depressing the opposite foot pedal, the wheels will be turned at an opposite angle to that above described. In this manner, it will be noted that the front wheeled frame 1 can be accurately guided from the rear thereof. The wheeled portion just described is really in the nature of a two-wheel truck and for convenience will be referred to as such. The truck has arranged thereon a suitable seat for the guide and the beam 72 has connected therewith suitable trees for the draft animals. Also on the beam there is an upstanding toothed segment 91 to which is centrally pivoted a lever 92. This lever has a hand operated spring influenced dog 93 that is normally in mesh with the teeth of the segment for holding the said lever against movement. Between the lever and the frame 1 there is a link or rod connection 94. By swinging the lever it will be noted that the frame 1 may be swung upon its pivotal connection with the ground wheels 3, and in this manner the forward ends of the snapping rolls may be properly guided to their work. From the motor and leading to the truck there are suitable rods 95 which control the clutch, spark and throttle of the motor, and it is thought that the foregoing description, when taken in connection with the drawings will fully set forth the construction, and advantages of the improvement to those skilled in the art to which such inventions relate and that further detailed description will not be considered necessary.

Preferably the troughs 13 are provided with shields in the nature of boards which prevent the corn from falling from the troughs and which serve as a guard for the stalks in directing the same to the snapping rollers.

Having described the invention, I claim:—

1. In a corn husking machine the combination, a wheeled frame, snapping rolls supported at a downward angle from the front thereof, said rolls having fluted bodies and conical threaded lower ends, a guard to the outer side of each of the rolls, husking rolls horizontally supported in superimposed pairs on the frame, spring means influencing the upper toward the lower husking rolls, a trough at the outer side of the snapping rolls and between the cooperating pairs of husking rolls, an endless conveyor in the trough, means for operating the same, means for simultaneously revolving the snapping and husking rolls, means receiving the corn from the husking rolls to deliver the same to one side of the frame, and operating means for said last mentioned means.

2. In a corn husking machine, the combination, a wheeled frame, guide means therefor, means for tilting the frame, snapping rolls supported at a downward angle from the front of the frame, arranged in cooperating pairs and comprising each a cylindrical body which is fluted and which has its lower end conical and threaded, husking rolls mounted horizontally on the frame and disposed in superimposed cooperating pairs, each of said snapping rolls having a conical end and laterally extending fingers on said ends, means pressing the upper toward the lower husking rolls, spring means centralizing the upper rolls on the lower rolls, a trough to the outer sides of the snapping rolls and between the cooperating pairs of husking rolls, an endless conveyor in the trough, means for imparting motion thereto, means for imparting simultaneous motion to the rolls, a delivery elevator to the rear of the husking rolls, and means for imparting motion thereto.

In testimony whereof I affix my signature.

GEORGE W. ZEIER.